(12) United States Patent
Ghosh et al.

(10) Patent No.: US 10,586,268 B2
(45) Date of Patent: Mar. 10, 2020

(54) METHOD AND SYSTEM FOR PROVIDING MERCHANT REFERRALS TO CONSUMERS

(71) Applicant: Mastercard International Incorporated, Purchase, NY (US)

(72) Inventors: Debashis Ghosh, Charlotte, NC (US); Randall K. Shuken, Westport, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 303 days.

(21) Appl. No.: 15/805,354

(22) Filed: Nov. 7, 2017

(65) Prior Publication Data

US 2018/0089741 A1 Mar. 29, 2018

Related U.S. Application Data (62) Division of application No. 14/299,491, filed on Jun. 9, 2014, now Pat. No. 9,842,359.

(51) Int. Cl.
*G06Q 30/06* (2012.01)

(52) U.S. Cl.
CPC .................. *G06Q 30/0631* (2013.01)

(58) Field of Classification Search
CPC ................................. G06Q 30/0631
USPC ........................................ 705/26.7
See application file for complete search history.

(56) References Cited

U.S. PATENT DOCUMENTS

| | | |
|---|---|---|
| 2011/0196725 A1 | 8/2011 | Malcolmson et al. |
| 2013/0060591 A1 | 3/2013 | Meegan |
| 2014/0046846 A1 | 2/2014 | Dogin et al. |
| 2014/0149202 A1* | 5/2014 | Owen .............. G06Q 30/0235 705/14.35 |
| 2015/0100383 A1* | 4/2015 | Chauhan .......... G06Q 30/0205 705/7.34 |

FOREIGN PATENT DOCUMENTS

CN 103593618 A * 2/2014 ............. G06F 21/60

OTHER PUBLICATIONS

TMS Global Services Pty Ltd, Veverka Mike and Board Brad File WIPO Patent Application for Lottery Promotion, Published (Oct. 27, 2013) in Global IP News .Business and Commerce Patent News, retrieved from Proquest Dialog on Oct. 15, 2019.*

* cited by examiner

*Primary Examiner* — Yogesh C Garg
(74) *Attorney, Agent, or Firm* — Buchanan Ingersoll & Rooney PC (57) ABSTRACT

A method for processing a consumer referral includes: storing, a plurality of location data entries, each entry including data related to a geographic location including a location identifier and location data; storing a plurality of referral data entries, each entry including data related to a referral including a referral identifier and one or more specific location identifiers; receiving a referral request, the request including a specific referral identifier encoded in a machine-readable code displayed at a specific geographic location associated with the specific referral identifier; identifying a specific referral data entry where the included referral identifier corresponds to the specific referral identifier; identifying a specific location data entry where the included location identifier corresponds to one of the one or more specific location identifiers included in the identified specific referral data entry; and transmitting the location data included in the identified specific location data entry in response to the request.

24 Claims, 10 Drawing Sheets

METHOD AND SYSTEM FOR PROVIDING MERCHANT REFERRALS TO CONSUMERS

FIELD

The present disclosure relates to the processing of consumer referrals, specifically the referring of a consumer from a first physical location (e.g., a first merchant) identified using a machine-readable code to another physical location having similar characteristics (e.g., a second merchant).

BACKGROUND

When a consumer visits a physical location of a merchant, they often expect that the merchant will have the capacity to serve them quickly. However, many consumers know that there may be times where a merchant may be unusually busy or closed, and that the consumer may need to wait to be served or assisted. At these times, some consumers may elect to go elsewhere to find the products or services they desire, such as choosing a different place to eat if the restaurant they initially visit has a long wait.

However, some consumers may be unaware of other similar locations nearby, particularly if the busy merchant is a specialty merchant, or if the consumer is set on a specific merchant and would only be interested in other locations of the same merchant. In order to find other suitable places to go instead of the busy merchant, many consumers may turn to their smartphones. Application programs have been designed for smartphones and other mobile communication devices to provide for searching of merchants in specified geographic areas. However, often times these application programs do not provide sufficient detail of other locations, may not identify specific merchants that are associated with the busy merchant, and may be cumbersome, difficult, and time consuming for consumers to use.

Thus, there is a need for a technical solution to provide fast and efficient referrals to consumers at a merchant location to another location.

SUMMARY

The present disclosure provides a description of systems and methods for the processing of consumer referrals.

A method for processing a consumer referral includes: storing, in a location database, a plurality of location data entries, wherein each location data entry includes data related to a geographic location including at least a location identifier and location data; storing, in a referral database, a plurality of referral data entries, wherein each referral data entry includes data related to a referral including at least a referral identifier and one or more specific location identifiers; receiving, by a receiving device, a referral request, wherein the referral request includes at least a specific referral identifier encoded in a machine-readable code displayed at a specific geographic location associated with the specific referral identifier; identifying, in the referral database, a specific referral data entry where the included referral identifier corresponds to the specific referral identifier; identifying, in the location database, a specific location data entry where the included location identifier corresponds to one of the one or more specific location identifiers included in the identified specific referral data entry; and transmitting, by a transmitting device, the location data included in the identified specific location data entry in response to the received referral request.

Another method for processing a consumer referral includes: reading, by a reading unit of a mobile communication device, data encoded in a machine-readable code displayed at a geographic location, wherein the data encoded in the machine-readable includes at least a referral identifier; transmitting, by a transmitting unit of the mobile communication device, a referral request including at least the referral identifier; receiving, by a receiving unit of the mobile communication device, a referral in response to the transmitted referral request, wherein the referral includes at least location data identified based on the referral identifier; and displaying, by a display unit of the mobile communication device, the received location data to a user of the mobile communication device.

A system for processing a consumer referral includes: reading, by a reading unit of a mobile communication device, data encoded in a machine-readable code displayed at a geographic location, wherein the data encoded in the machine-readable includes at least a referral identifier; transmitting, by a transmitting unit of the mobile communication device, a referral request including at least the referral identifier; receiving, by a receiving unit of the mobile communication device, a referral in response to the transmitted referral request, wherein the referral includes at least location data identified based on the referral identifier; and displaying, by a display unit of the mobile communication device, the received location data to a user of the mobile communication device.

A mobile communication device for processing a consumer referral includes a reading unit, a transmitting unit, a receiving unit, and a display unit. The reading unit is configured to read data encoded in a machine-readable code displayed at a geographic location, wherein the data encoded in the machine-readable includes at least a referral identifier. The transmitting unit is configured to transmit a referral request including at least the referral identifier. The receiving unit is configured to receive a referral in response to the transmitted referral request, wherein the referral includes at least location data identified based on the referral identifier. The display unit is configured to display the received location data to a user of the mobile communication device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Processing Consumer Referrals

Figure 1A:
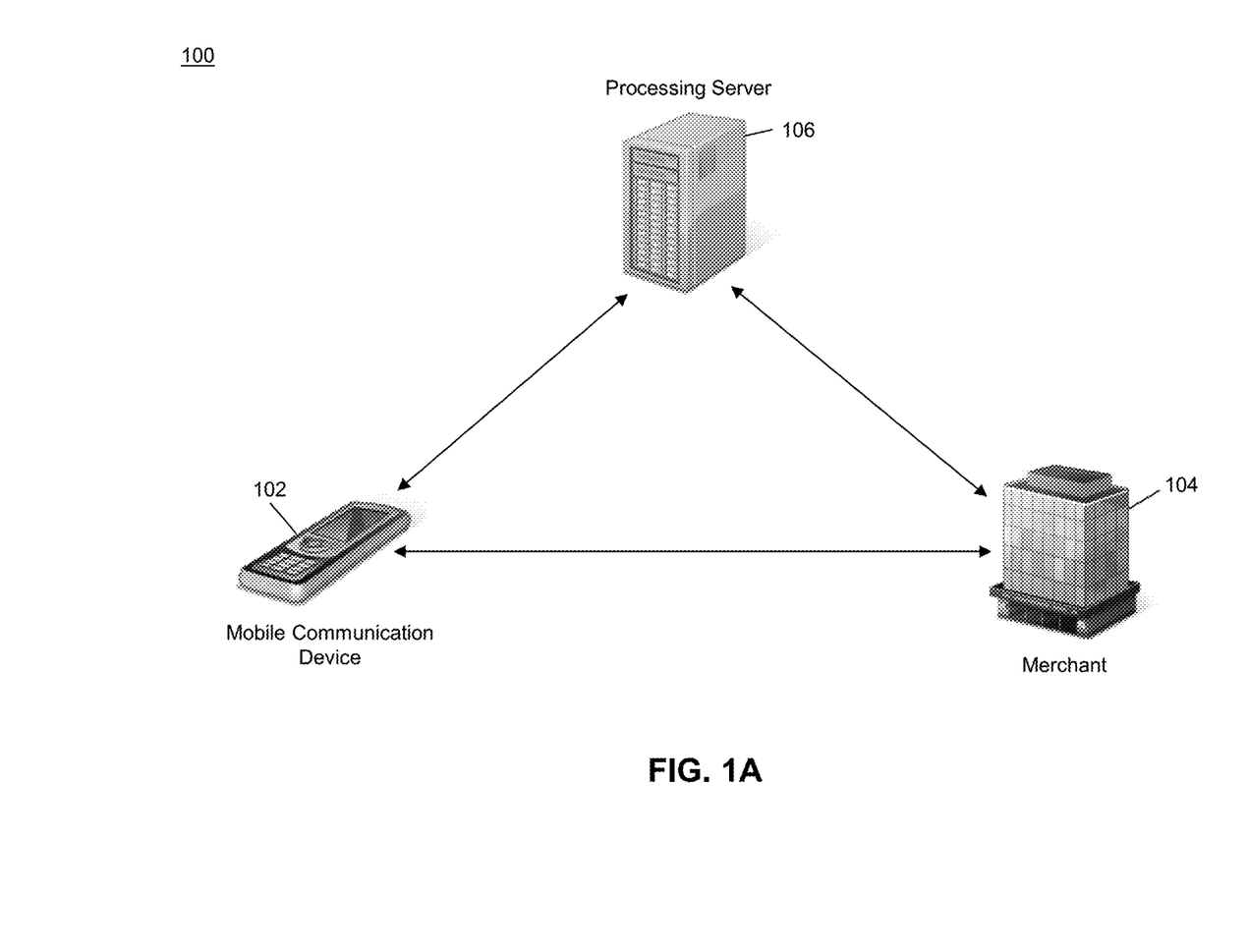
FIGS. 1A and 1B are high level architectures illustrating a system for processing consumer referrals in accordance with exemplary embodiments.
Figure 1B:
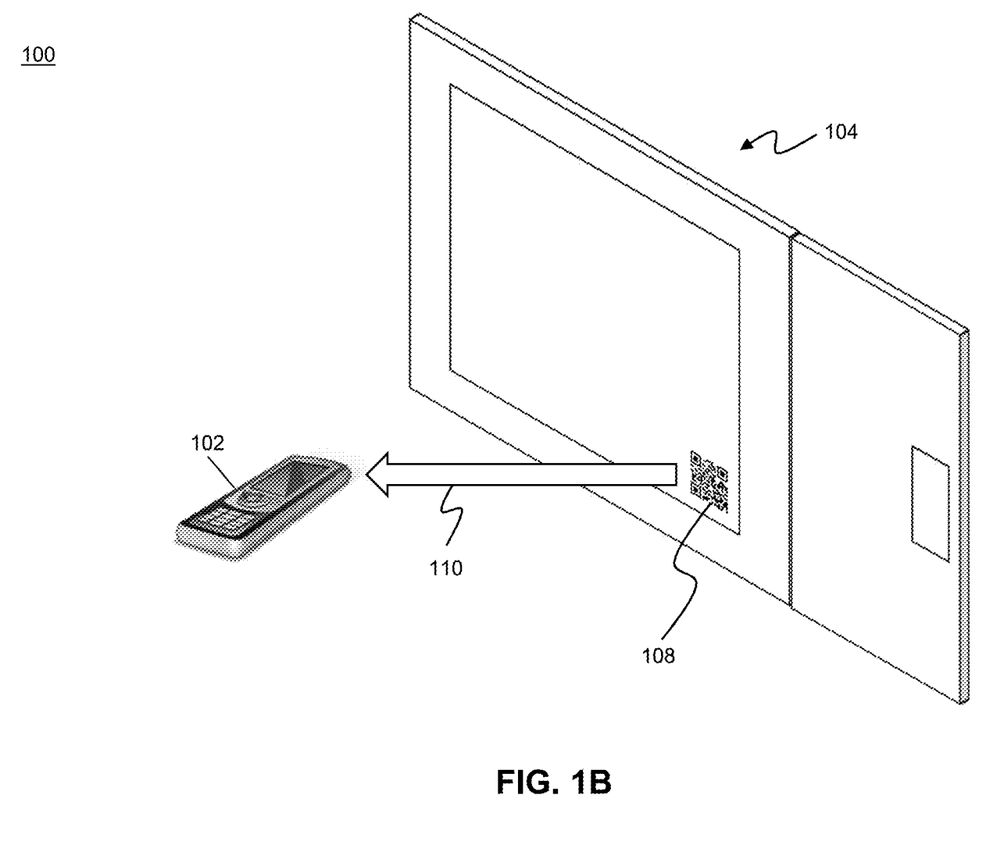

FIGS. 1A and 1B illustrate a system 100 for the processing of consumer referrals at a merchant location to a mobile communication device.

The system 100 may include a mobile communication device 102. The mobile communication device 102, discussed in more detail below, may be any type of mobile communication device suitable for performing the functions disclosed herein as will be apparent to persons having skill in the relevant art, such as a mobile phone, cell phone, smart phone, tablet computer, notebook computer, laptop computer, etc. The mobile communication device 102 may be carried to a merchant 104 by a consumer or other user associated with the mobile communication device 102. The user may arrive at the merchant 104 and, for one reason or another, decide that they would prefer to visit an alternative merchant and seek a referral.

As illustrated in FIG. 4B, a machine-readable code 108 may be visible at the storefront of the merchant 104. The mobile communication device 102 may be used to capture an image of the machine-readable code 108 in imaging step 110. The mobile communication device 102 may then read data encoded in the machine-readable code 108 to be used to obtain a referral to a different merchant.

Referral information may be provided to the mobile communication device by a processing server 106. The processing server 106, as discussed in more detail below, may be configured to transmit referral data to the mobile communication device 102 for presentation to a user. In one embodiment, the mobile communication device 102 may transmit the data encoded in the machine-readable code 108 to the processing server 106 after reading. In such an embodiment, the encoded data may include an identifier, which the processing server 106 may use, as discussed in more detail below, to identify a referred location. The processing server 106 may then transmit geographic data associated with the referred location to the mobile communication device 102. The mobile communication device 102 may then display the geographic data, such as via a mapping application program, to the user, which may assist the user in visiting the referred merchant. Additionally, the processing server 106 may conduct analysis of the effectiveness, need, use and cost of the referrals to both the referring location and the referred location, as well as tracking possible referral rewards or other consideration, for example.

In another embodiment, the processing server 106 may periodically transmit referral data to the mobile communication device 102. The mobile communication device 102 may then store the received referral data locally on the device. Once the machine-readable code 108 is read and the encoded data identified, the mobile communication device 102 may identify referral data stored locally on the mobile communication device 102 to identify a referred location, and then display the associated geographic data to the user.

The referred location may be a merchant having similar characteristics to the merchant 104 where the machine-readable code 108 is posted. For instance, the referred location may be an additional location of the same merchant 104. In another example, if the merchant 104 is a restaurant, the referred location may be another restaurant having similar cuisine, a similar aesthetic, or may be preferred by customers of the merchant 104 based on user feedback and reviews. In yet another example, the referred location may be based on the geographic location of the merchant 104 and the referred location, such as by identifying the closest competing merchant. In another example, the referred location may be identified by the merchant 104, such as referring customers to another merchant based on an agreement, such as one where the referred location would refer customers back to the merchant 104.

In some embodiments, the processing server 106 may be configured to provide referral payments to the merchant 104 displaying the machine-readable code 108. In such an embodiment, the processing server 106 may initiate a payment transaction for a referral payment to the merchant 104 when a customer is referred to another location. In some instances, the referral payment may only be made if a user associated with the mobile communication device 102 conducts a payment transaction at the referred location. The conducting of a payment transaction may be identified using methods that will be apparent to persons having skill in the relevant art, such as the use of a wallet application on the mobile communication device 102, an identifier included in transaction details as being associated with the user or the mobile communication device 102, etc. In some embodiments, the processing server 106 may accumulate referral data to make periodic, batch payments to the merchant 104 based on referrals.

In some embodiments, coupons, discounts, rewards information, offers, or other content may be provided to a user of the mobile communication device 102 when viewing a referral. For example, the geographic data displayed on the mobile communication device 102 may be accompanied by an offer or coupon for the referred location, which may provide for additional influence to the user to visit the referred location. In some instances, multiple referred locations may be displayed to the user of the mobile communication device 102. In such an instance, specific referred locations may have offers associated with them, such as sponsored listings. In one embodiments, users may receive rewards for visiting referred merchants, such as a rewards program where the user may earn deals, discounts, or other perks.

In some embodiments, the processing server 106 may be configured to identify traffic data regarding referred locations. For instance, the processing server 106 may be part of or in communication with a payment network or the referred location. The processing server 106 may analyze data regarding payment transactions being conducted at the referred location and identify if the referred location is more or less busy than usual for the day and/or time. The processing server 106 may then provide information regarding the status of the referred location to the mobile communication device 102 along with the geographic data. In such an embodiment, the user of the mobile communication device 102 may be able to see a referred location, and also see how busy the location is, to determine if they want to visit the referred location or seek another referral.

The use of machine-readable codes 108 to trigger referral data to be displayed on the mobile communication device 102 may provide for fast, easy, and efficient referrals to other merchant locations. By receiving referral information immediately and for referrals that are directly related to the merchant 104, users of mobile communication devices 102 may be able to depart for a different merchant faster and with less work on their part than using traditional means for locating other merchants. In addition, in embodiments where batch updates of referral data are sent to the mobile communication device 102 and the referrals processed locally on the mobile communication device 102, the user may be able to receive a referral even in instances where their mobile communication device 102 lacks a connection with their communications network. Furthermore, in instances where referral payments are provided to the merchant 104, merchants 104 may be encouraged to refer consumers to other locations, to both manage their own capacity as well as earn additional income.

Processing Server

Figure 2:
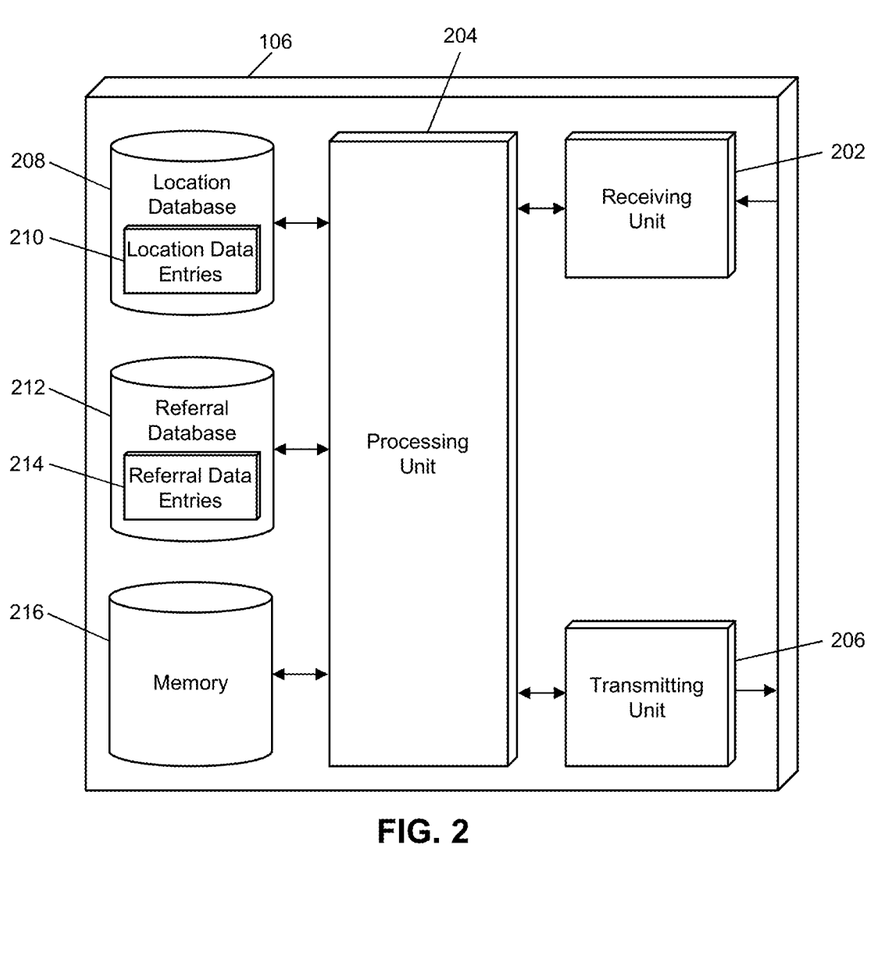
FIG. 2 is a block diagram illustrating the processing server of FIG. 1 for the processing and transmission of consumer referrals in accordance with exemplary embodiments.

FIG. 2 illustrates an embodiment of the processing server 106 of the system 100. It will be apparent to persons having skill in the relevant art that the embodiment of the processing server 106 illustrated in FIG. 2 is provided as illustration only and may not be exhaustive to all possible configurations of the processing server 106 suitable for performing the functions as discussed herein. For example, the computer system 900 illustrated in FIG. 9 and discussed in more detail below may be a suitable configuration of the processing server 106.

The processing server 106 may include a location database 208. The location database 208 may be configured to store a plurality of location data entries 210. Each location data entry 210 may include data related to a geographic location including at least a location identifier and location data. The location identifier may be a unique value suitable for identification of the corresponding location data entry 210, such as an identification number. The location data may include data regarding the related geographic location, such as a street address, geographic coordinates, etc. In some embodiments, the location identifier and location data may be the same value, such as a street address.

The processing server 106 may also include a referral database 212. The referral database 212 may be configured to store a plurality of referral data entries 214. Each referral data entry 214 may include data related to a referral including at least a referral identifier and one or more specific location identifiers. The referral identifier may be a unique value suitable for identification of the corresponding referral data entry 214, such as an identification number. The referral identifier may be encoded in the machine-readable code 108 displayed at a corresponding merchant 104. In some embodiments, the referral database 212 and location database 208 may be a single database, with the referral identifier being the location identifier in a single location data entry 210 that includes both location data for a location and referral data.

The specific location identifiers included in a referral data entry 214 may correspond to merchant locations to which a mobile communication device 102 may be referred. In some embodiments, the specific location identifiers may be accompanied by criteria, such as for use in selecting particular location identifiers from the specific location identifiers.

The processing server 106 may also include a receiving unit 202. The receiving unit 202 may be configured to receive data over one or more networks via one or more network protocols. The receiving unit 202 may receive a referral identifier from the mobile communication device 102, such as decoded from the machine-readable code 108. The processing server 106 may include a processing unit 204. The processing unit 204 may be configured to perform the functions disclosed herein, as will be apparent to persons having skill in the relevant art. The processing unit 204 may identify a referral data entry 214 in the referral database where the included referral identifier corresponds to the referral identifier received by the receiving unit 202.

The processing unit 204 may be further configured to identify one or more specific location identifiers included in the identified referral data entry 214. The one or more specific location identifiers may be based on any suitable criteria as will be apparent to persons having skill in the relevant art, such as distance from the merchant 104, traffic data associated with corresponding merchants, characteristics of a user of the mobile communication device 102, customer feedback, user feedback, etc.

The processing unit 204 may then identify location data entries 210 for each of the identified one or more specific location identifiers. The processing server 106 may include a transmitting unit 206, which may be configured to transmit data over one or more networks via one or more network protocols. The transmitting unit 206 may transmit the location data included in each of the identified location data entries 210 to the mobile communication device 102 for display to the user.

The processing unit 204 may also include a memory 216. The memory 216 may be configured to store data suitable for performing the functions disclosed herein as will be apparent to persons having skill in the relevant art. For example, the memory 216 may be configured to store rules regarding the identification of the one or more specific location identifiers, for analyzing traffic data of a merchant location, for storing user data, such as user or consumer feedback regarding referrals, etc.

In some embodiments, the transmitting unit 206 may be configured to transmit referral data to the mobile communication device 102. In such an embodiment, the transmitting unit 206 may regularly transmit referral data entries 214 and/or location data entries 210 to the mobile communication device 102 for processing of referrals without real-time communication with the processing server 106. In some instances, the transmitting unit 206 may transmit the referral data to the mobile communication device 102 upon receipt of a data request by the receiving unit 202. In other instances, the transmitting unit 206 may transmit the referral data to the mobile communication device 102 at predetermined intervals, such as daily, weekly, etc.

In embodiments where referral payments may be made to the merchant 104 when a user is successfully referred to another location, the processing server 106 may be further configured to initiate a payment transaction for the referral payment to the merchant 104. In such an embodiment, the receiving unit 202 may receive an indication that a referral payment is to be made. The indication may be notification of a payment transaction involving the user of the mobile communication device 102 at the referred location, a notification from the referred location, a notification from the mobile communication device 102, or other suitable indication as will be apparent to persons having skill in the relevant art.

Once the indication has been received, the processing unit 204 may be configured to generate an authorization request for a payment transaction. The authorization request may include at least information indicating the merchant 104 (e.g., or a financial institution associated with the merchant 104) as a payee and including a predetermined transaction amount. The transaction amount may be based on the merchant 104, a transaction conducted between the user of the mobile communication device 102 and the referred location, the referred location, or any other suitable criteria. The authorization request may then be submitted to a payment network and/or processed by the processing unit 204 to process the referral payment to the merchant 104.

Mobile Communication Device

Figure 3:
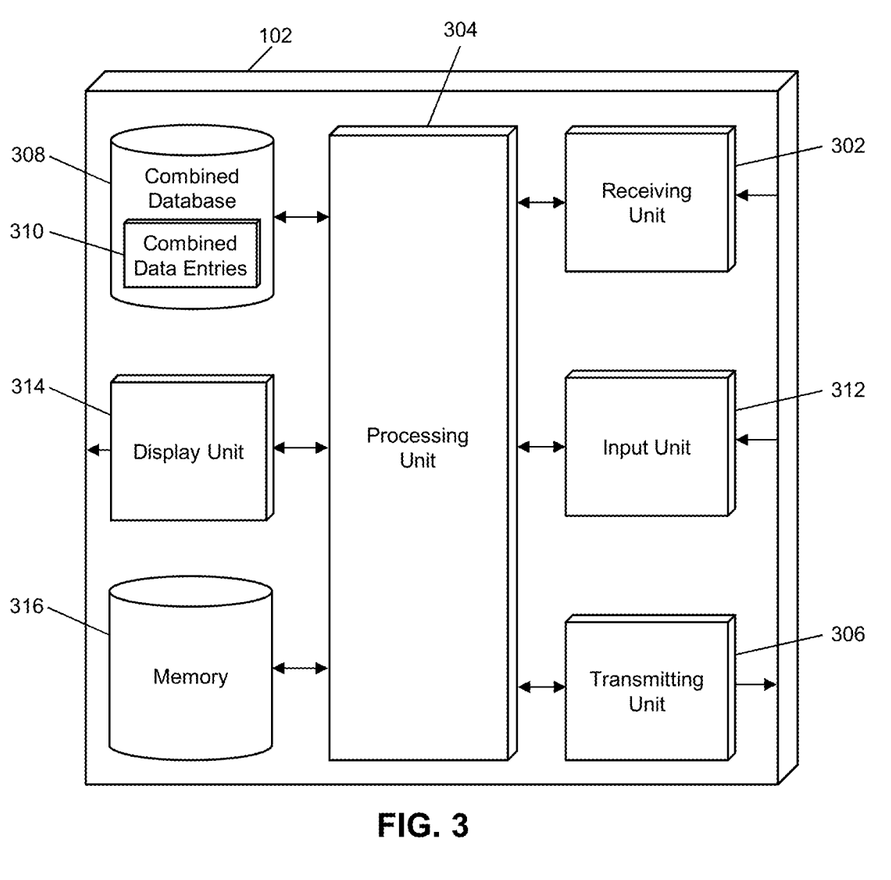
FIG. 3 is a block diagram illustrating the mobile communication device of FIG. 1 for the processing and display of consumer referrals in accordance with exemplary embodiments.

FIG. 3 illustrates an embodiment of the mobile communication device 102 of the system 100. It will be apparent to persons having skill in the relevant art that the embodiment of the mobile communication device 102 illustrated in FIG. 3 is provided as illustration only and may not be exhaustive to all possible configurations of the mobile communication device 102 suitable for performing the functions as discussed herein. For example, the computer system 900 illustrated in FIG. 9 and discussed in more detail below may be a suitable configuration of the mobile communication device 102.

The mobile communication device 102 may include an input unit 312. The input unit 312 may be configured to read the machine-readable code 108 displayed at the merchant 104. The input unit 312 may be any type of input unit suitable for performing the functions disclosed herein, such as a camera, microphone, etc. The input unit 312 may also be configured to receive input from a user of the mobile communication device 102, such as via a keyboard, mouse, click wheel, scroll wheel, touch screen, etc.

The mobile communication device 102 may include a processing unit 304. The processing unit 304 may be configured to perform the functions disclosed herein as will be apparent to persons having skill in the relevant art. The processing unit 304 may decode the read machine-readable code 108 to obtain an encoded referral identifier. The referral identifier may then be transmitted to the processing server 106 by a transmitting unit 306 configured to transmit data over one or more networks via one or more network protocols.

In response to the transmitted referral identifier, a receiving unit 302 of the mobile communication device 102 may receive location data corresponding to one or more referral locations. The receiving unit 302 may be configured to receive data over one or more networks via one or more network protocols, such as via a cellular communication network associated with the mobile communication device 102. The processing unit 304 may forward the received location data to a display unit 314 for display to a user of the mobile communication device 102.

The display unit 314 may be configured to display the location data using one or more specially configured interfaces as will be apparent to persons having skill in the relevant art. For example, the location data may be displayed via a map, via a list of directions to the referred location from a present geographic location, via a list of referred merchants, or any other suitable means. In some instances, the location data may be displayed as part of an application program used for referrals, such as one executed by the processing unit 304 based on program code stored in a memory 316 of the mobile communication device. The display unit 314 may display the location data accordingly and may be any type of display device suitable for performing the functions disclosed herein, such as a capacitive touch display, liquid crystal display, light emitting diode display, etc.

In some embodiments, the mobile communication device 102 may also include a combined database 308. The combined database 308 may be configured to store referral and location data in the form of a plurality of combined data entries 310. Each combined data entry 310 may be configured to store data related to a geographic location including at least a location identifier, location data, and one or more referral locations. In such an embodiment, the data stored in each of the combined data entries 310 may be received by the receiving unit 302 from the processing server 106. In some instances, the transmitting unit 306 may transmit a request for data to the processing server 106 to prompt sending of the location and referral data. In other instances, the receiving unit 302 may receive location and referral data from the processing server 106 at predetermined intervals.

In embodiments where the mobile communication device 102 may be configured to process referrals, the processing unit 304 may be configured to identify a combined data entry 310 that includes a location identifier corresponding to the referral identifier decoded from the read machine-readable code 108. The processing unit 304 may then identify one or more of the referral identifiers included in the identified combined data entry 310. Once the one or more referral identifiers have been identified, the processing unit 304 may identify the combined data entries 310 corresponding to those referral identifiers. The location data included in those combined data entries 310 may then be displayed to the user via the display unit 314.

Process for Identifying and Displaying Referrals

Figure 4:
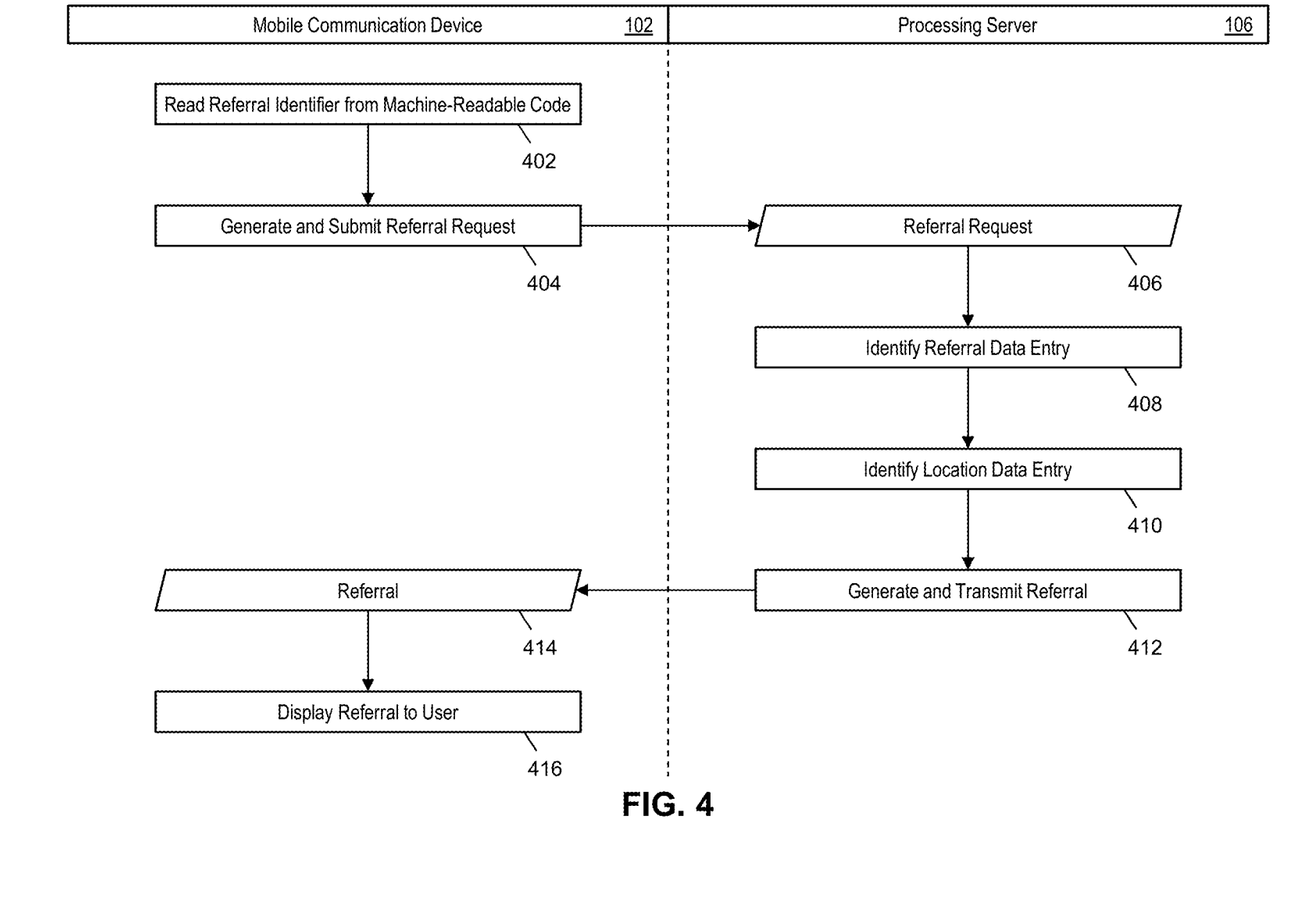
FIG. 4 is a flow diagram illustrating a method for the real-time processing of a consumer referral in accordance with exemplary embodiments.

FIG. 4 illustrates a process for the processing of referrals using the system 100.

In step 402, the input unit 312 of the mobile communication device 102 may read the machine-readable code 108 displayed at the merchant 104. The processing unit 304 may decode the referral identifier encoded in the read machine-readable code 108. In step 404, the processing unit 304 may generate a request for a referral, which may include the decoded referral identifier, and may submit the request to the processing server 106 via the transmitting unit 306 of the mobile communication device 102.

In step 406, the receiving unit 202 of the processing server 106 may receive the referral request including the referral identifier. In step 408, the processing unit 204 of the processing server 106 may identify a referral data entry 214 in the referral database 212 where the included referral identifier corresponds to the referral identifier included in the received referral request. In step 410, the processing unit 204 may then identify a location data entry 210 in the location database 208 where the included location identifier corresponds to a location identifier included in the identified referral data entry 214. In some embodiments, the processing unit 204 may select the location identifier included in the identified referral data entry 214 based on predetermined criteria.

In step 412, the processing unit 204 may generate a referral, which may be transmitted by the transmitting unit 206 of the processing server 106 to the mobile communication device 102. In step 414, the receiving unit 302 of the mobile communication device 102 may receive the referral, which may include at least the location data associated with the referred location as included in the identified location data entry 210. In step 416, the display unit 314 of the mobile communication device 102 may display the location data associated with the referred location to the user of the mobile communication device 102. The user may then visit the referred location.

In embodiments where the merchant 104 may receive a referral payment for providing the referral, the processing server 106 may receive, via the receiving unit 202, an indication of success of the referral, and may then generate and submit an authorization request for the referral payment to be paid to the merchant 104. In such an embodiment, the success of the referral may be identified via the conducting of a payment transaction involving both a user of the mobile communication device 102 and the referred merchant.

Figure 5:
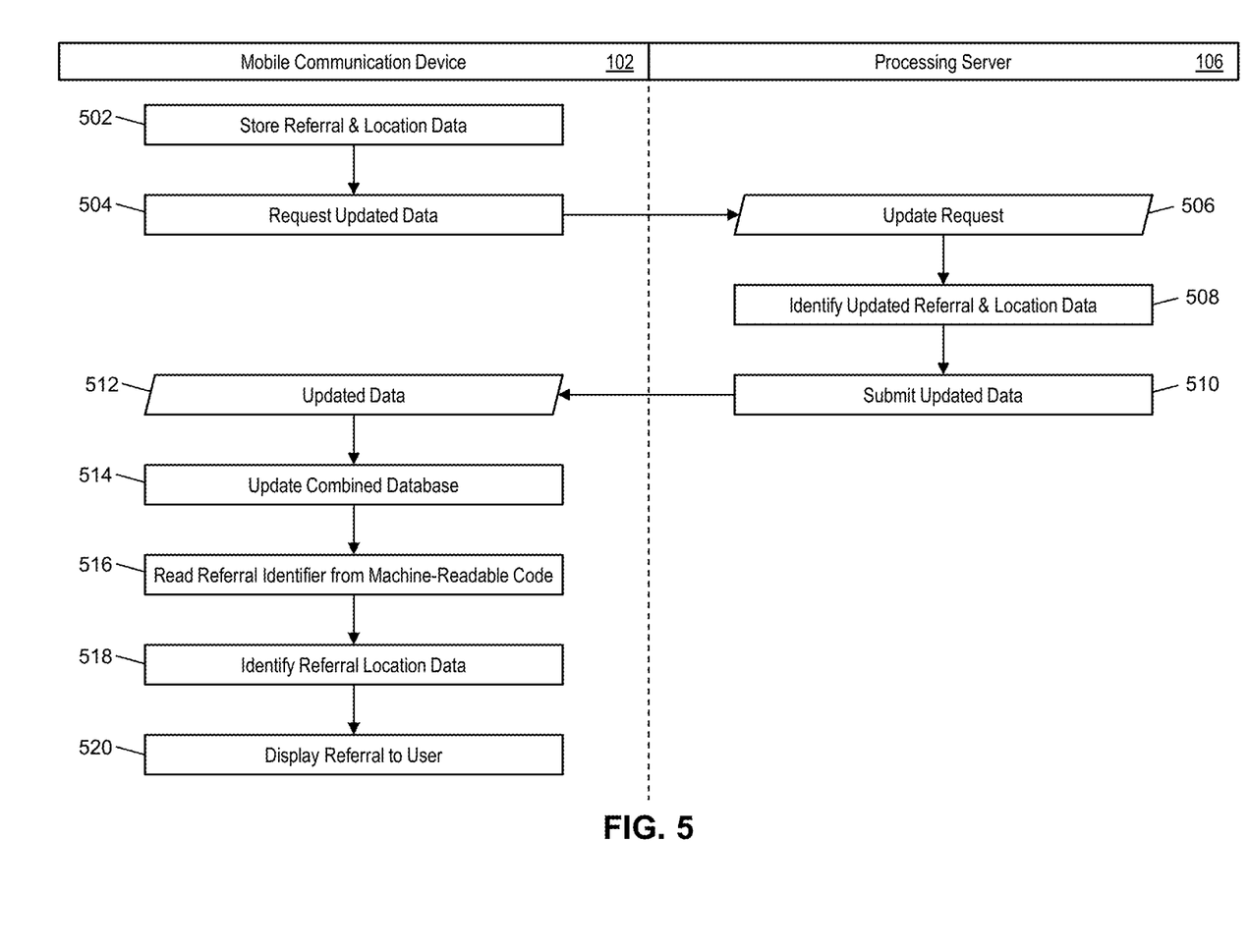
FIG. 5 is a flow diagram illustrating a method for the batch updating and processing of consumer referrals in accordance with exemplary embodiments.

FIG. 5 illustrates an alternative process for processing a referral using the system 100.

In step 502, the mobile communication device 102 may store referral and location data as a plurality of combined data entries 310 in the combined database 308, with each combined data entry 310 including at least a location identifier, location data, and one or more referral identifiers. In step 504, the transmitting unit 306 of the mobile communication device 102 may transmit a request for updated referral and/or location data to the processing server 106. In step 506, the receiving unit 202 of the processing server 106 may receive the request.

In step 508, the processing unit 204 of the processing server 106 may identify updated referral and/or location data in the referral database 212 and/or location database 208, respectively. In some embodiments, the update request may include a time and/or date of a previous update, and the processing server 106 may identify only data that has been updated since the time and/or date of the previous update. In step 510, the transmitting unit 206 of the processing server 106 may transmit the updated referral and/or location data to the mobile communication device 102.

In step 512, the receiving unit 302 of the mobile communication device 102 may receive the updated referral and/or location data. In step 514, the processing unit 304 of the mobile communication device 102 may update the combined data entries 310 in the combined database 308 with the received updated referral and/or location data. In step 516, the input unit 312 of the mobile communication device 102 may read a machine-readable code 108 displayed at the merchant 104. The processing unit 304 may decode a referral identifier encoded in the read machine-readable code 108.

In step 518, the processing unit 304 may identify a combined data entry 310 that includes a location identifier corresponding to the decoded referral identifier. The processing unit 304 may then identify a second combined data entry 310 that includes a location identifier corresponding to a referral identifier included in the identified combined data entry 310. Then, in step 520, the display unit 314 of the mobile communication device 102 may display, to the user, the location data included in the second combined data entry 310.

Graphical User Interface

Figure 6:
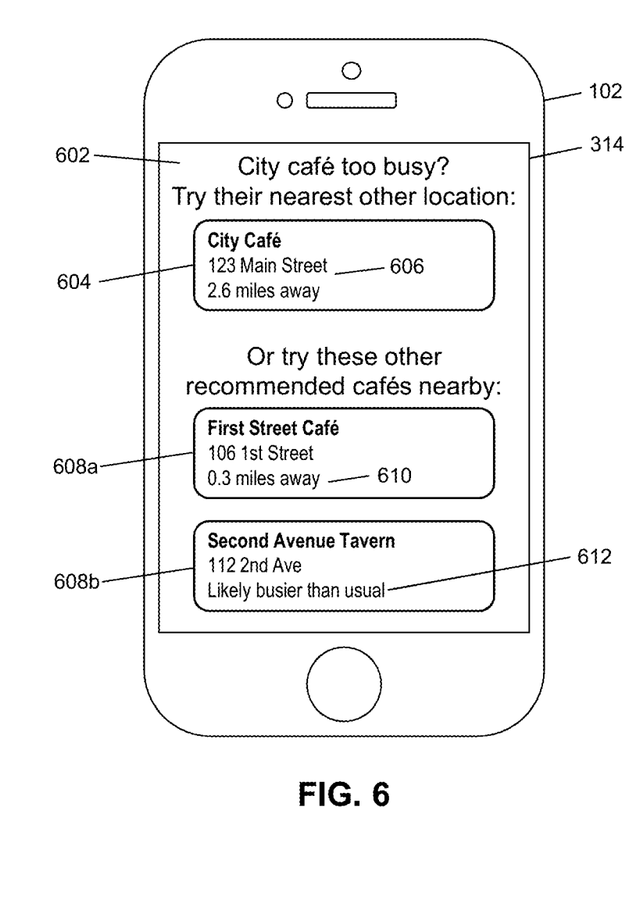
FIG. 6 is an illustrative graphical user interface for the display of a processed consumer referral on a mobile communication device in accordance with exemplary embodiments.

FIG. 6 illustrates an exemplary graphical user interface of the mobile communication device 102 for displaying received referral location data. It will be apparent to persons having skill in the relevant art that the interface illustrated in FIG. 6 is provided as an illustration only, and that other suitable user interfaces including additional and/or alternative content may be used.

As illustrated in FIG. 6, the display unit 314 of the mobile communication device 102 may display referrals once the machine-readable code 108 is read at the merchant 104. The referral display may include a merchant name 602, which may indicate to the user of the mobile communication device 102 that their location was accurately identified. The referral display may also include a first referral 604. In the illustrated embodiment, the first referral 604 is a referral to another location operated by the same merchant 104, the City Café. The first referral 604 may also include street address 606. The street address 606 may include a street address of the other location that may be used for navigation to the location. In some instances, referrals may include a distance 610, which may be a distance to the location based on the user's current geographic location. In some embodiments, the user may be able to interact with the first referral 604 on the display (e.g., via the input unit 312) to display a map of the location or to receive directions to the location from the current location.

The referral display may also include additional referrals 608, illustrated in FIG. 6 as additional referrals 608a and 608b. The additional referrals may include the street address 606 and distance 610 for the corresponding location, and, in some instances, may also or alternatively include traffic information 612. In the illustrated embodiment, the traffic information 612 may indicate if the corresponding referred location is more or less busy than usual for the current time and/or date, such as based on payment transactions being conducted at the referred location or based on information provided by the referred location. In another example, the traffic information 612 may include information regarding current vehicular traffic, such as an estimated travel time to the street address 606 based on current traffic patterns. The user of the mobile communication device 102 may then select a referral accordingly based on the provided criteria, and navigate to the referred location.

First Exemplary Method for Processing Consumer Referrals

Figure 7:
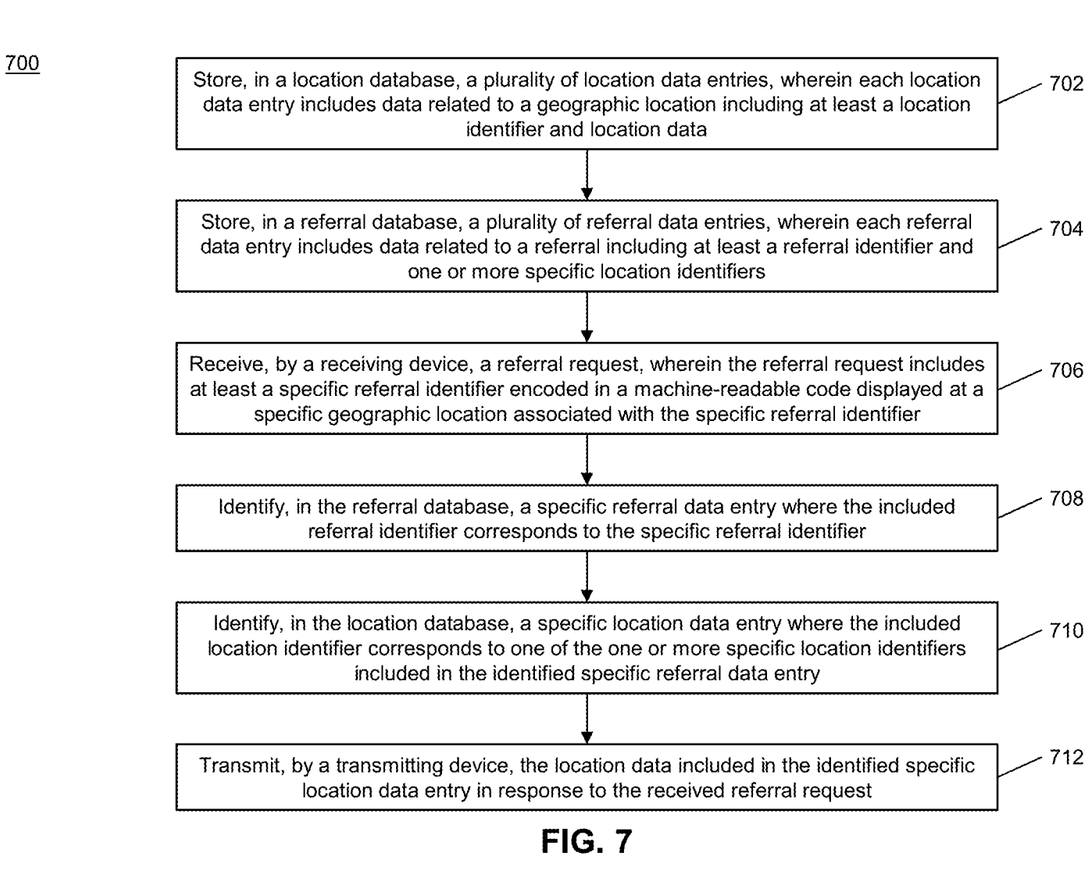
FIGS. 7 and 8 are flow charts illustrating exemplary methods for processing consumer referrals in accordance with exemplary embodiments.

FIG. 7 illustrates a method 700 for processing consumer referrals to a mobile communication device.

In step 702, a plurality of location data entries (e.g., location data entries 210) may be stored in a location database (e.g., the location database 208), wherein each location data entry 210 includes data related to a geographic location including at least a location identifier and location data. In one embodiment, the location data may include at least one of: a street address, latitude and longitude, and a visual map of the related geographic location. In step 704, a plurality of referral data entries (e.g., the referral data entries 214) may be stored in a referral database (e.g., the referral database 212), wherein each referral data entry 214 includes data related to a referral including at least a referral identifier and one or more specific location identifiers. In one embodiment, the referral database 212 and the location database 208 may be a single database, and the single database may include a plurality of data entries each related to a geographic location including a location identifier, location data, referral identifier, and one or more specific location identifiers, and wherein the included location identifier and referral identifier are the same value.

In step 706, a referral request may be received by a receiving device (e.g., the receiving unit 202), wherein the referral request includes at least a specific referral identifier encoded in a machine-readable code (e.g., the machine-readable code 108) displayed at a specific geographic location associated with the specific referral identifier. In step 708, a specific referral data entry 214 may be identified in the referral database 212 where the included referral identifier corresponds to the specific referral identifier.

In step 710, a specific location data entry 210 may be identified in the location database 208 where the included location identifier corresponds to one of the one or more specific location identifiers included in the identified specific referral data entry 214. In step 712, the location data included in the identified specific location data entry 210 may be transmitted, by a transmitting device (e.g., the transmitting unit 206) in response to the received referral request. In one embodiment, each location data entry may further include rewards data, and transmitting the location data may include transmitting the rewards data included in the identified specific location data entry 210.

In some embodiments, the method 700 may further include: processing, by a processing device (e.g., the processing unit 204), a payment transaction to a merchant (e.g., the merchant 104) associated with the specific referral identifier as compensation for the referral. In a further embodiment, the method 700 may also include receiving, by the receiving device 202, a transaction notification indicating a payment transaction conducted involving a merchant associated with the identified specific location data entry 210, wherein the transaction notification is received prior to processing the payment transaction.

Second Exemplary Method for Processing Consumer Referrals

Figure 8:
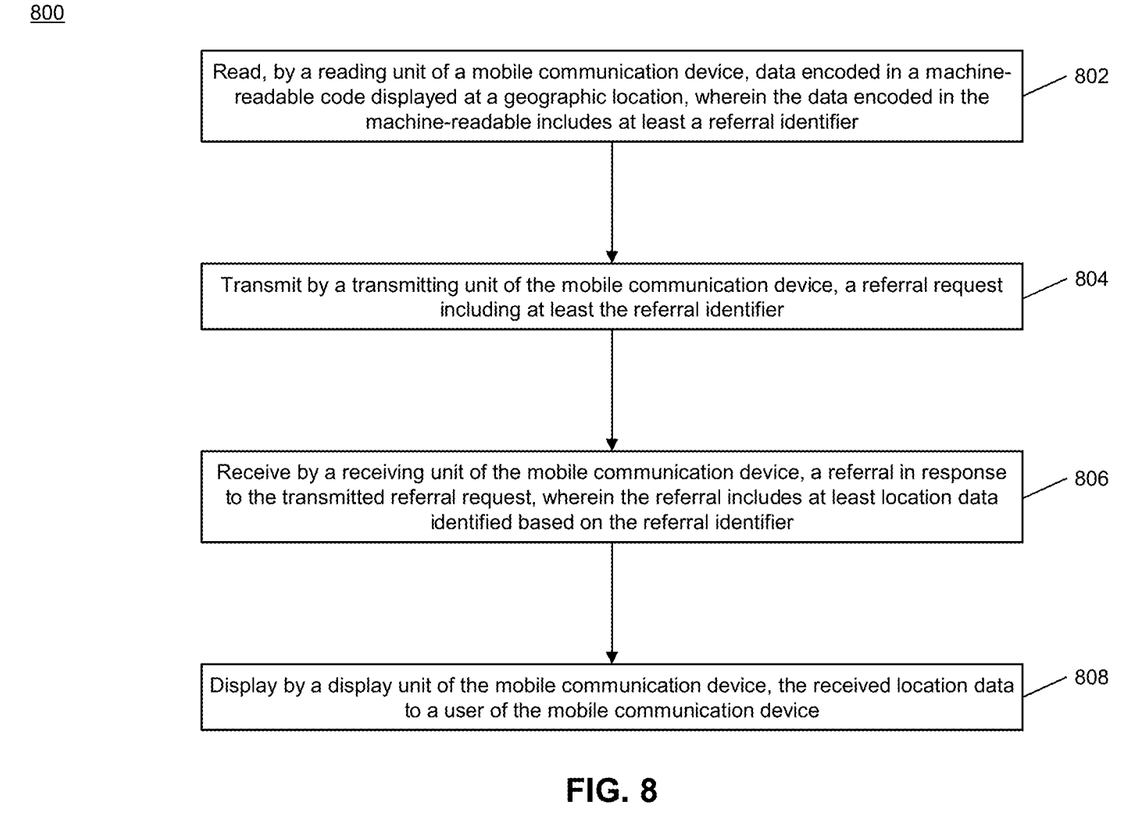

FIG. 8 illustrates a method 800 for processing consumer referrals to a mobile communication device.

In step 802, a reading unit (e.g., the input unit 312) of a mobile communication device (e.g., the mobile communication device 102) may read data encoded in a machine-readable code (e.g., the machine-readable code 108) displayed at a geographic location, wherein the data encoded in the machine-readable code 108 includes at least a referral identifier. In step 804, a referral request including at least the referral identifier may be transmitted by a transmitting unit (e.g., the transmitting unit 306) of the mobile communication device 102.

In step 806, a receiving unit (e.g., the receiving unit 302) of the mobile communication device 102 may receive a referral in response to the transmitted referral request, wherein the referral includes at least location data identified based on the referral identifier. In one embodiment, the location data may include at least one of: a street address, latitude and longitude, and a visual map of the related geographic location. In step 808, a display unit (e.g., the display unit 314) of the mobile communication device 102 may display the received location data to a user of the mobile communication device 102. In some embodiments, the referral may further includes rewards data, and displaying the received location data may include displaying the received rewards data to the user of the mobile communication device 102.

In one embodiment, the method 800 may further include storing, in a referral database (e.g., the combined database 308) of the mobile communication device 102, a plurality of referral data entries (e.g., combined data entries 310), wherein each referral data entry 310 includes at least a specific referral identifier and specific location data. In a further embodiment, the method 800 may further include: identifying, by a processor (e.g., the processing unit 304) of the mobile communication device 102, a specific referral data entry in the referral database where the included specific referral identifier corresponds to the referral identifier included in the data encoded in the machine-readable code 108; and generating, by the processor 304 of the mobile communication device 102, the referral, wherein the referral request is transmitted to the processor 304 of the mobile communication device 102 and the referral is received from the processor 304 of the mobile communication device 102.

In an even further embodiment, the method 800 may also include: receiving, by the receiving unit 302 of the mobile communication device 102, update data, wherein the update data includes at least a plurality of specific referral identifiers and corresponding updated specific location data; and updating, in the referral database, the specific location data included in each referral data entry 310 including a specific referral identifier of the plurality of specific referral identifiers based on the corresponding updated specific location data.

Computer System Architecture

Figure 9:
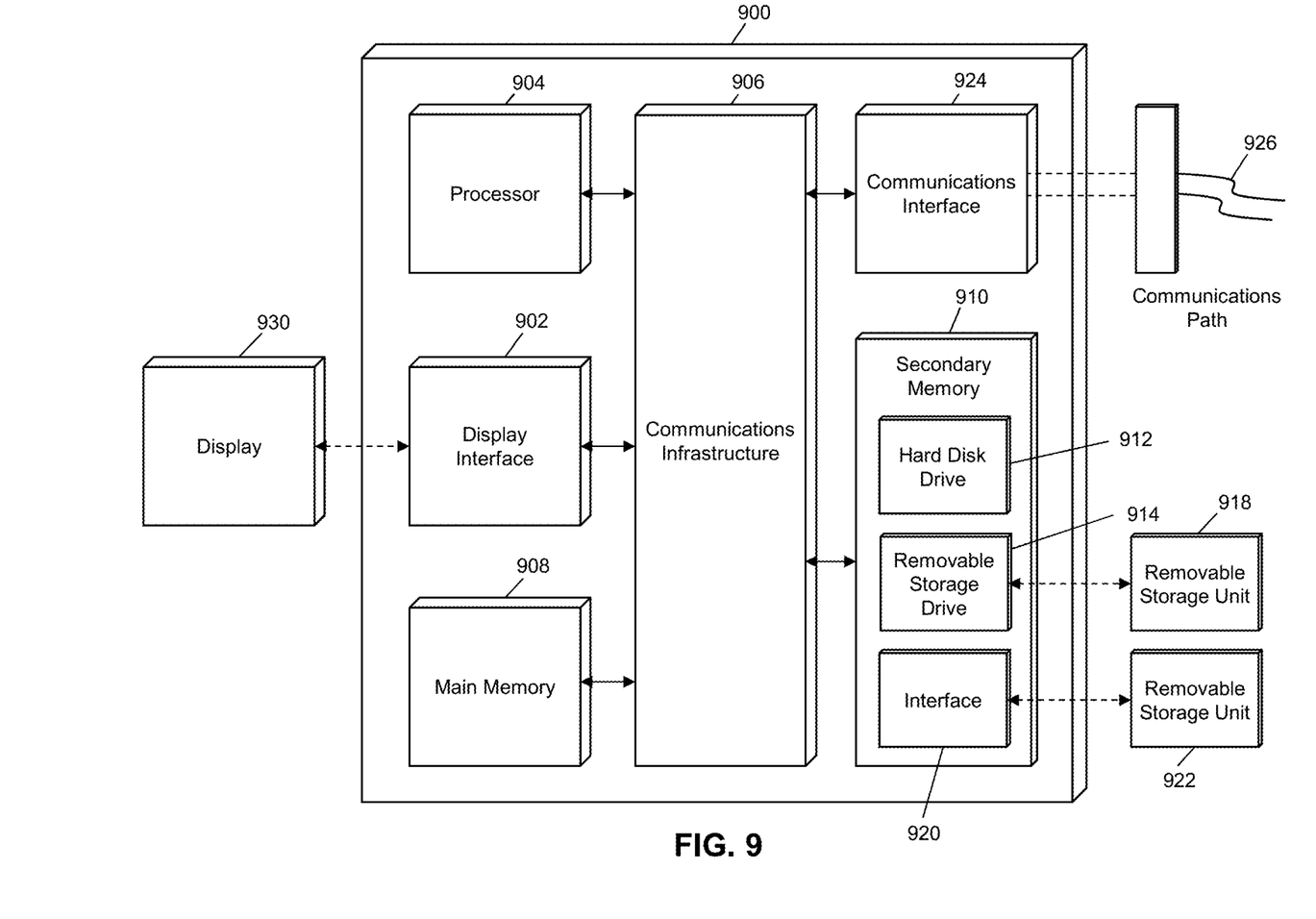
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the mobile communication device 102 and processing server 106 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4, 5, 7, and 8.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 4, 5, 7, and 8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

Techniques consistent with the present disclosure provide, among other features, systems and methods for processing consumer referrals. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a consumer referral, comprising:
   reading, by a reading unit of a mobile communication device, data encoded in a machine-readable code displayed at a specific geographic location, wherein the data encoded in the machine-readable code includes at least a referral identifier;
   transmitting, by a transmitting unit of the mobile communication device, a referral request including at least a specific referral identifier encoded in the machine-readable code displayed at the specific geographic location;
   receiving, by a receiving unit of the mobile communication device from a referral database that stores a plurality of referral data entries wherein each referral data entry includes data related to a referral including at least a referral identifier and one or more specific location identifiers, a specific referral identified in the referral database to correspond to the specific referral identifier encoded in the machine-readable code in response to the transmitted referral request, wherein the referral includes at least location data identified based on the referral identifier and on the specific geographic location displaying the machine-readable code; and displaying, by a display unit of the mobile communication device, the received location data to a user of the mobile communication device.

2. The method of claim 1, wherein the plurality of referral data entries are stored in the mobile communication device, the method further comprising generating, by the processor of the mobile communication device, the referral, wherein the referral request is transmitted to the processor of the mobile communication device, and the referral is received from the processor of the mobile communication device.

3. The method of claim 2, further comprising:

receiving, by the receiving unit of the mobile communication device, update data, wherein the update data includes at least a plurality of specific referral identifiers and corresponding updated specific location data; and updating, in the referral database, the specific location data included in each referral data entry including a specific referral identifier of the plurality of specific referral identifiers based on the corresponding updated specific location data.

4. The method of claim 1, wherein the location data includes at least one of:

a street address, latitude and longitude, and a visual map of a related geographic location.

5. The method of claim 1, wherein the referral further includes rewards data, and wherein displaying the received location data to a user of the mobile communication device further includes displaying the received rewards data to the user of the mobile communication device.

6. The method of claim 1, wherein the plurality of data entries are stored in a processing server that is located at a location remote from the mobile communication device, the method further comprising receiving, by the receiving unit of the mobile communication device from the remote processing server, the referral.

7. A mobile communication device for processing a consumer referral, comprising:

a reading unit configured to read data encoded in a machine-readable code displayed at a geographic location, wherein the data encoded in the machine-readable code includes at least a referral identifier;

a transmitting unit configured to transmit a referral request including at least a specific referral identifier encoded in a machine-readable code displayed at a specific geographic location;

a receiving unit configured to receive a referral from a referral database that stores a plurality of referral data entries wherein each referral data entry includes data related to a referral including at least a referral identifier and one or more specific location identifiers, a specific referral identified in the referral database to correspond to the specific referral identifier in response to the transmitted referral request, wherein the referral includes at least location data identified based on the referral identifier and on the geographic location displaying the machine-readable code; and a display unit configured to display the received location data to a user of the mobile communication device.

8. The mobile communication device of claim 7, further comprising:

the referral database; and a processor configured to generate the referral, wherein the transmitting unit is configured to transmit the referral request to the processor of the mobile communication device, and the receiving unit is configured to receive the referral from the processor of the mobile communication device.

9. The system of claim 7, wherein the receiving unit is further configured to receive update data, the update data includes at least a plurality of specific referral identifiers and corresponding updated specific location data, and the processor is further configured to update, in the referral database, the specific location data included in each referral data entry including a specific referral identifier of the plurality of specific referral identifiers based on the corresponding updated specific location data.

10. The system of claim 7, wherein the location data includes at least one of: a street address, latitude and longitude, and a visual map of a related geographic location.

11. The system of claim 7, wherein the referral further includes rewards data, and wherein displaying the received location data to a user of the mobile communication device further includes displaying the received rewards data to the user of the mobile communication device.

12. The system of claim 7, wherein the plurality of data entries are stored in a processing server that is located at a location remote from the mobile communication device, wherein the receiving unit of the mobile communication device is further configured to receive, from the remote processing server, the referral.

13. A method for processing a consumer referral, comprising:

reading, by a reading unit of a mobile communication device, data encoded in a machine-readable code displayed at a geographic location, wherein the data encoded in the machine-readable code includes at least a referral identifier;

transmitting, by a transmitting unit of the mobile communication device, a referral request including at least the referral identifier;

receiving, by a receiving unit of the mobile communication device, a referral in response to the transmitted referral request, wherein the referral includes at least location data identified based on the referral identifier and on the geographic location displaying the machine-readable code; and displaying, by a display unit of the mobile communication device, the received location data to a user of the mobile communication device.

14. The method of claim 13, further comprising:

storing, in a referral database of the mobile communication device, a plurality of referral data entries, wherein each referral data entry includes at least a specific referral identifier and specific location data;

identifying, by a processor of the mobile communication device, a specific referral data entry in the referral database where the included specific referral identifier corresponds to the referral identifier included in the data encoded in the machine-readable code; and generating, by the processor of the mobile communication device, the referral, wherein
the referral request is transmitted to the processor of the mobile communication device, and
the referral is received from the processor of the mobile communication device.

15. The method of claim 14, further comprising:
receiving, by the receiving unit of the mobile communication device, update data, wherein the update data includes at least a plurality of specific referral identifiers and corresponding updated specific location data; and
updating, in the referral database, the specific location data included in each referral data entry including a specific referral identifier of the plurality of specific referral identifiers based on the corresponding updated specific location data.

16. The method of claim 13, wherein the location data includes at least one of: a street address, latitude and longitude, and a visual map of the related geographic location.

17. The method of claim 13, wherein the referral further includes rewards data, and wherein displaying the received location data to a user of the mobile communication device further includes displaying the received rewards data to the user of the mobile communication device.

18. A mobile communication device for processing a consumer referral, comprising:
a reading unit configured to read data encoded in a machine-readable code displayed at a geographic location, wherein the data encoded in the machine-readable code includes at least a referral identifier;
a transmitting unit configured to transmit a referral request including at least the referral identifier;
a receiving unit configured to receive a referral in response to the transmitted referral request, wherein the referral includes at least location data identified based on the referral identifier and on the geographic location displaying the machine-readable code; and
a display unit configured to display the received location data to a user of the mobile communication device.

19. The system of claim 18, further comprising:
a referral database configured to store a plurality of referral data entries, wherein each referral data entry includes at least a specific referral identifier and specific location data; and
a processor configured to
identify a specific referral data entry in the referral database where the included specific referral identifier corresponds to the referral identifier included in the data encoded in the machine-readable code, and
generate the referral, wherein
the referral request is transmitted to the processor, and
the referral is received from the processor.

20. The system of claim 19, wherein
the receiving unit is further configured to receive update data,
the update data includes at least a plurality of specific referral identifiers and corresponding updated specific location data, and
the processor is further configured to update, in the referral database, the specific location data included in each referral data entry including a specific referral identifier of the plurality of specific referral identifiers based on the corresponding updated specific location data.

21. The system of claim 20, wherein the location data includes at least one of: a street address, latitude and longitude, and a visual map of the related geographic location.

22. The system of claim 20, wherein the referral further includes rewards data, and wherein displaying the received location data to a user of the mobile communication device further includes displaying the received rewards data to the user of the mobile communication device.

23. The system of claim 18, wherein the location data includes at least one of: a street address, latitude and longitude, and a visual map of the related geographic location.

24. The system of claim 18, wherein the referral further includes rewards data, and wherein displaying the received location data to a user of the mobile communication device further includes displaying the received rewards data to the user of the mobile communication device.

* * * * *